Dec. 8, 1953  A. TRASK  2,661,603
VAULT CONDITIONER WITH CONTROL MEANS
Filed Dec. 18, 1950  6 Sheets-Sheet 2
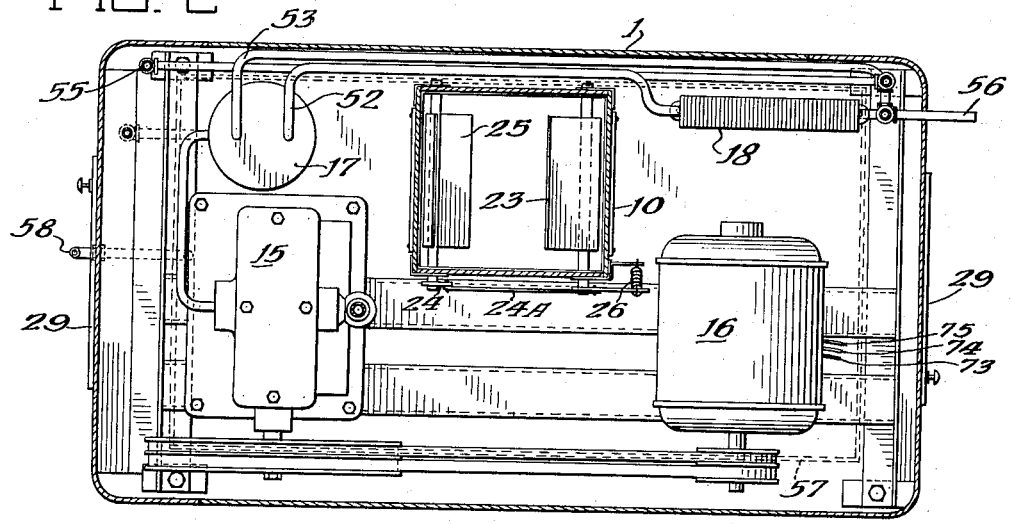
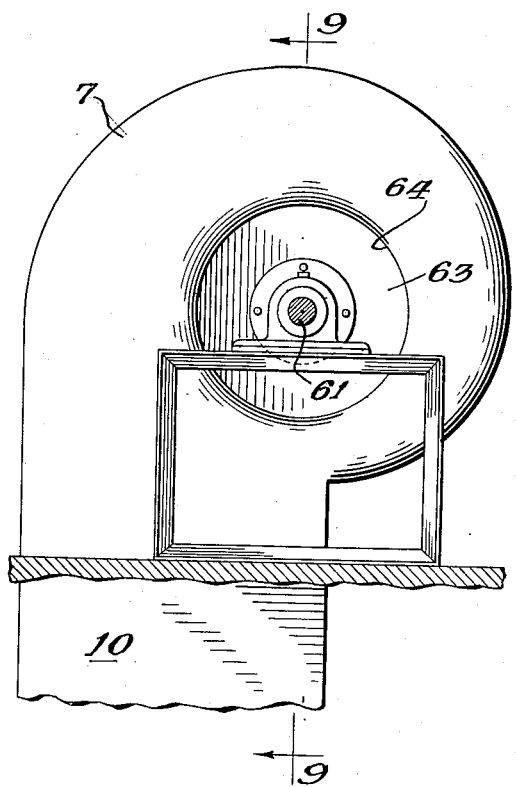
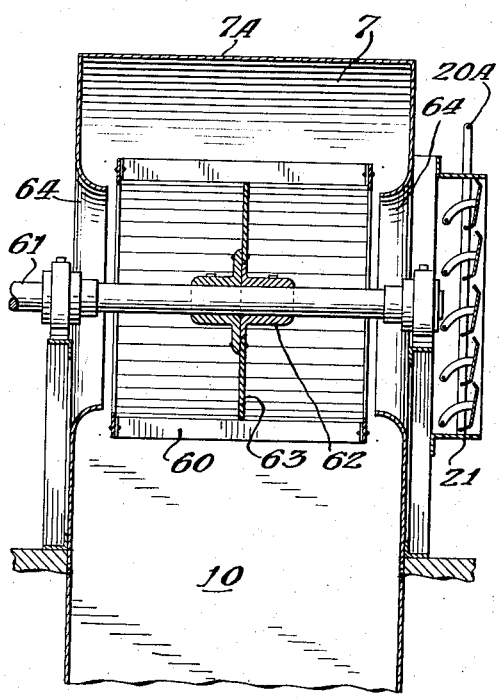
Inventor:
Allen Trask
By Zabel & Gritzbaugh
Attorneys Dec. 8, 1953  A. TRASK  2,661,603
VAULT CONDITIONER WITH CONTROL MEANS
Filed Dec. 18, 1950  6 Sheets-Sheet 3
FIG. 3
FIG. 4
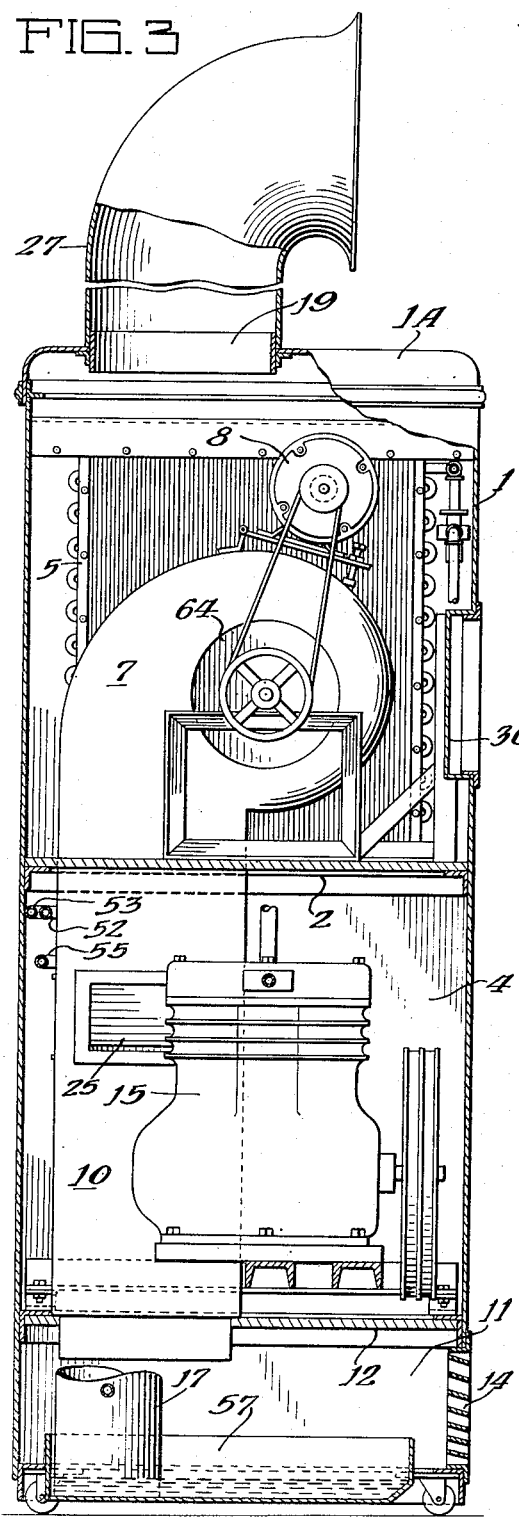
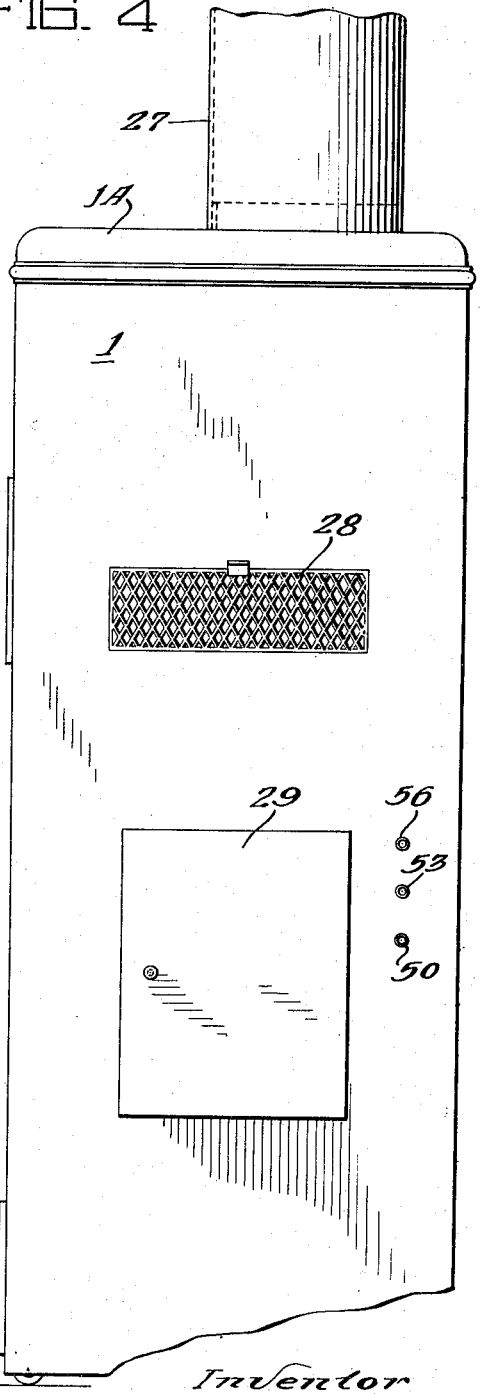
Inventor
Allen Trask
By Zahel & Gritzbaugh
Attorneys Dec. 8, 1953 A. TRASK 2,661,603
VAULT CONDITIONER WITH CONTROL MEANS
Filed Dec. 18, 1950 6 Sheets-Sheet 5

Inventor:
Allen Trask
By Zabel & Gritzbaugh
Attorneys

Dec. 8, 1953 A. TRASK 2,661,603
VAULT CONDITIONER WITH CONTROL MEANS
Filed Dec. 18, 1950 6 Sheets-Sheet 6

Inventor:
Allen Trask
By Zabel & Ditzbaugh
Attorneys

Patented Dec. 8, 1953

2,661,603

UNITED STATES PATENT OFFICE 2,661,603

VAULT CONDITIONER WITH CONTROL MEANS

Allen Trask, Chicago, Ill.

Application December 18, 1950, Serial No. 201,259

7 Claims. (Cl. 62—6)

This invention relates to unitary machines for automatically controlling the relative humidity and temperature of merchandise storage vaults, and more particularly to self-contained machines constructed to meet the storage requirements of furs, foods, seeds and other products sensitive to water vapor and temperature.

There has been a continually expanding need in the handling of merchandise sensitive to excessive humidity and temperature for a humidity and temperature controlling machine completely self-contained in one cabinet which may be easily installed in a room or vault. A compact, small sized unit at a comparatively low cost is urgently needed.

Refrigeration machines have been in the past and are now extensively used to condition the storage rooms and vaults for food, furs, etc., but these conventional systems have been individually engineered and installed in separate pieces into the premises of the purchaser. These conventional cold storage installations are costly and are not adapted to automatic humidity control.

An object of this invention is a compact, self-contained, low cost machine constructed for automatically controlling the temperature and humidity of a storage room.

Another object is a storage conditioning machine constructed to cool and recirculate air in a storage room in parallel with the natural thermosyphonic tendency of the air to flow in response to heat leakage into the room.

A further object is the construction of a storage conditioning machine to withdraw air from the ceiling level of a storage room, cool it and reduce its humidity, and then discharge it at the floor level of the room.

Another object is the embodiment of a fumigant evaporating means in the air recirculating system of the machine for fumigating storage rooms.

Still another object is a storage conditioning machine of the refrigeration type constructed to use its heat of operation for reduction of relative humidity in a storage room.

A still further object of this invention is a machine of the type described wherein the temperature of a refrigerant evaporator is caused to drop in response to an increase of relative humidity in the air of a storage room.

Other purposes, objects and advantages to this invention will be understood from the detailed specification and explanation following:

This invention lies in a storage conditioning machine embodying a compression type refrigeration system including a compressor, a motor, a condenser and an evaporator and an air circulating blower which is constructed with means for reducing the volume of air circulated over the evaporator in response to a rise in relative humidity of the ambient air.

This invention contemplates several variations of structure by which air flow volume over the evaporator may be reduced. It may be reduced by reducing the speed of a variable speed motor driving the blower or fan moving air over the evaporator. It may be reduced by by-passing a portion of the air moved around the evaporator. It may be reduced by restricting the air inlet to the evaporator blower or fan.

The preferred method of reducing the flow volume of air over the evaporator contemplated by this invention is shown in the drawings. A double inlet evaporator blower with a centrally partitioned blower wheel is used. A shutter means is constructed to close one inlet to the blower and render one half of the blower wheel inoperative, thereby reducing the air flow through the evaporator to approximately one half.

This invention embraces constructions which draw air from the ceiling level of a room, cool the air, and then discharge the cooled air at the floor level. Improved distribution of cooled air is gained by virtue of the heavier weight of cooled air which causes it to spread in the stratum at the floor level. As the air warms it rises to be replaced with freshly cooled air underneath. The warmest air in the room collects at the ceiling level from whence it is withdrawn by machines embodying this invention to be again cooled and recirculated.

This invention embraces a novel structure for attaining rapid humidity reduction in response to a demand registered by an electric contact in a humidistat. The recirculated air is reduced substantially in temperature and volume, and a portion of it is then led through a separate compressor compartment of the machine where the air is reheated by the heat of operation of the compressor and the compressor motor. The cooling operation condenses water vapor from the air which in this process becomes saturated. The reheating operation reduces the relative humidity of the air using the heat generated by the operation of the compressor and its motor which would otherwise serve no useful purpose.

All of the foregoing constitute some of the principal objects and advantages of the present invention, others of which will become apparent from the following description and from the drawings, in which Fig. 1 is a front elevation view of a storage conditioning machine embodying this invention with the front enclosure panels removed in section to show the interior of the machine, Fig. 2 shows a horizontal cross section of Fig. 1, through sectional lines 2—2, looking downward upon the compressor compartment;

Fig. 3 shows a vertical cross section of Fig. 1 with the left side enclosure panel removed to show the interior of the machine, the left cooling coil is also removed to show the blower assembly;

Fig. 4 is a side elevation view of the right hand side of the cabinet enclosing the machine; the air intake duct from the ceiling level being shown and also an auxiliary side air inlet opening;

Fig. 8 shows a vertical side elevation view of the cool air blower assembly in the evaporator compartment;

Fig. 9 shows a vertical cross sectional view of the cool air blower and its shutter assembly taken on sectional line 9—9 of Fig. 8.

Figure 1:
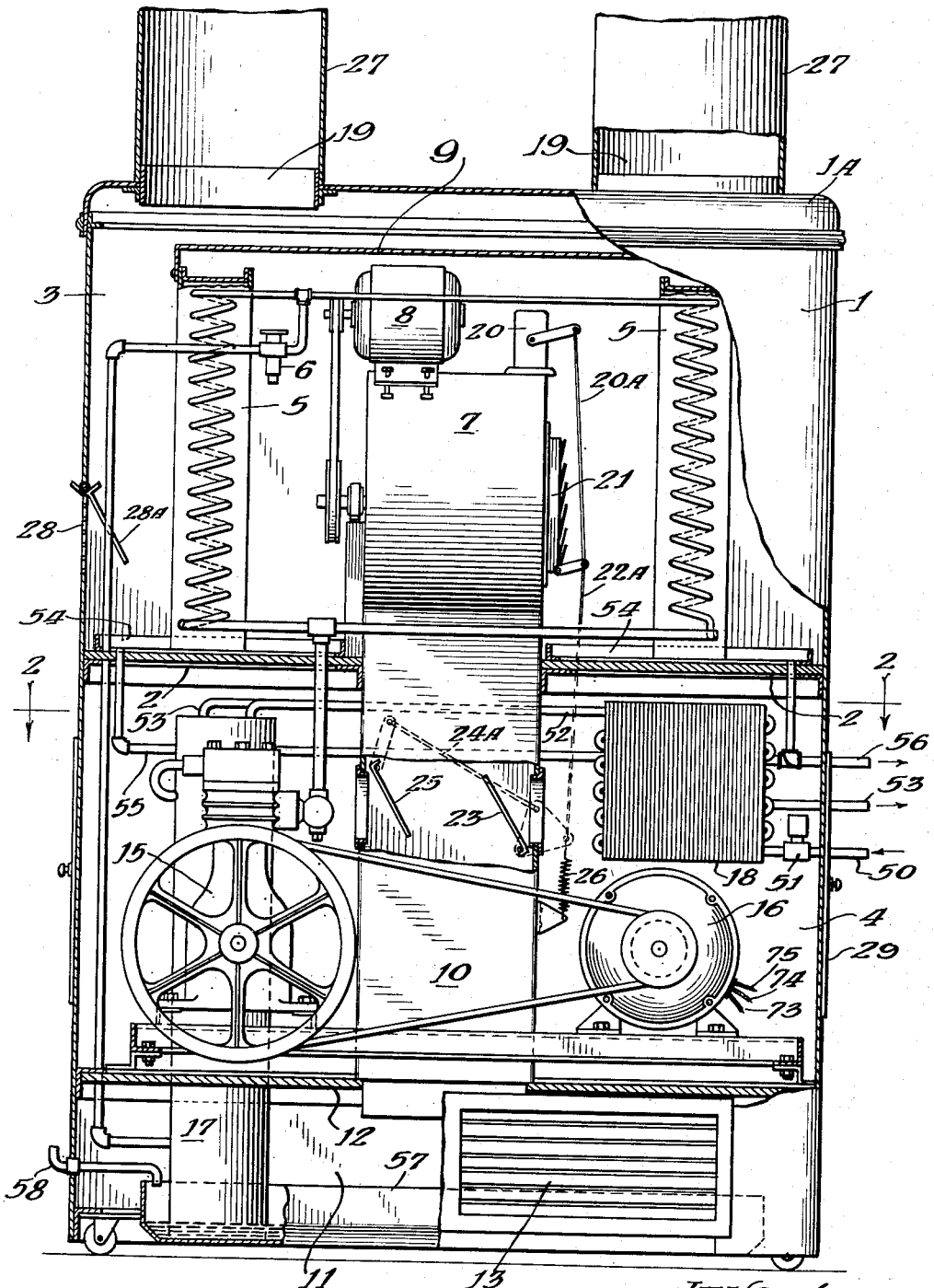

Referring to Fig. 1, a steel cabinet 1 is shown enclosing the mechanism of the machine. A horizontal partition 2 divides the interior of the cabinet 1 into an upper chamber 3 and a lower chamber 4. In the upper chamber 3 are two refrigerant evaporators 5, an expansion valve 6, a cool air blower 7 and a blower motor 8. The top cover 1-A of the cabinet 1 is the top of upper chamber 3 in which two air openings 19 provide entrance for recirculated room air. A horizontal partition 9, transverse of cabinet 1 directs incoming air to the outward faces of the two refrigerant evaporators 5.

Figure 6:
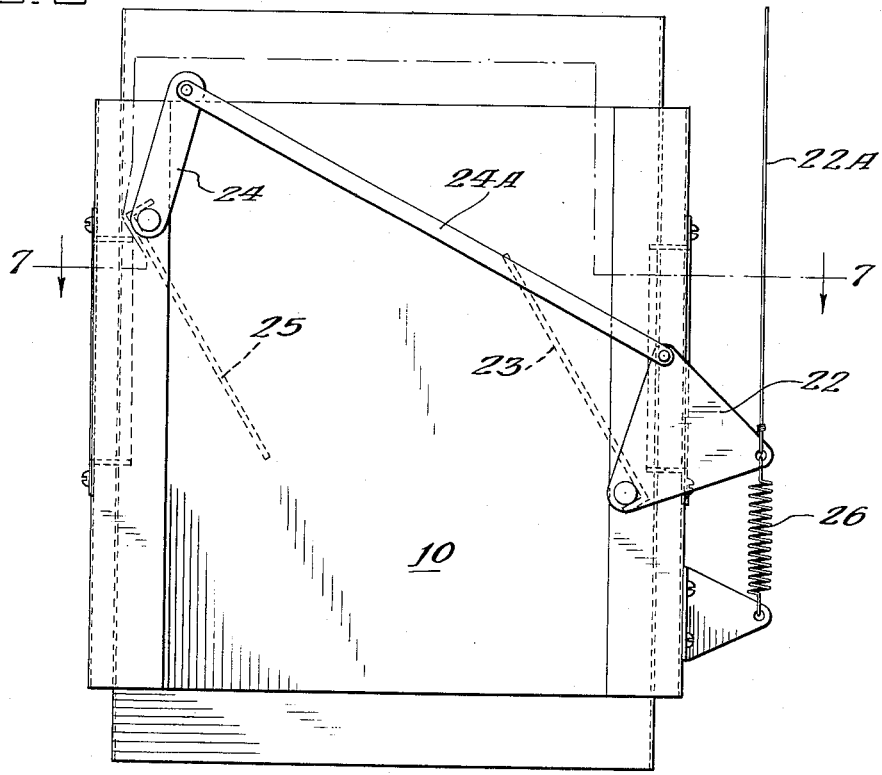
Fig. 6 shows a portion of the cool air duct extending through the compressor compartment of the machine with its dampers and damper controls.
Figure 7:
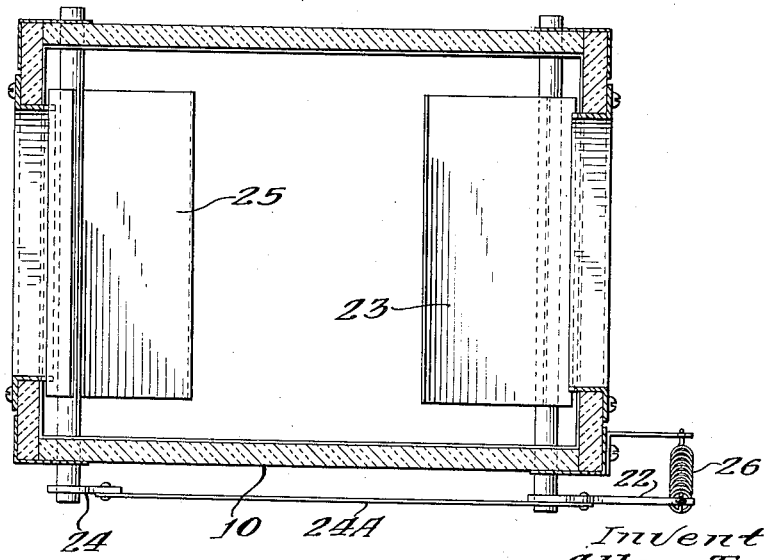
Fig. 7 shows a horizontal cross section through the duct assembly of Fig. 6, looking downward upon section line 7—7.

A cool air duct 10 shown separately in Figs. 6 and 7 extends from blower 7, through lower chamber 4 to plenum chamber 11, under partition 12, which divides the lower chamber 4 from plenum chamber 11. A cool air discharge grille 13 with horizontal louvers 14 directs the cooled air outward at the floor level parallel with the floor.

In the lower chamber 4 there is shown a compression type refrigeration condensing unit consisting of a reciprocating compressor 15, an electric motor 16 for driving the compressor, a conventional water cooled condenser-receiver unit 17 and a cooling coil 18 for cooling this compressor compartment with cool water on its way to the condenser unit 17.

There is a cold water inlet pipe 50 entering the cabinet 1 to provide cooling water for the water cooled condensing unit. Water inlet pipe 50 communicates with water control valve 51, which is a conventional refrigerant pressure controlled valve. Water control valve 51 communicates with cooling coil 18, used for cooling the air in the condensing unit compartment 4. The outlet of coil 18 communicates with the water inlet of the condenser receiver unit 17, through pipe 52. The water outlet of the condenser-receiver unit 17 is a pipe 53, terminating outside the cabinet 1.

There is an evaporator pan 54 under each evaporator 5 for catching the condensate. These pans have drain outlets through pipes 55 which join and communicate with drain outlet pipe 56.

A shallow horizontal pan 57 covers substantially the bottom of the cabinet 1 and provides a bottom to plenum chamber 11. A conduit 58 extends from the outside of the cabinet 1 to communicate with pan 57 for filling it with liquid fumigant.

Referring to Figs. 8 and 9, blower 7 comprises a blower housing 7-A and a double inlet blower wheel 60 mounted on shaft 61 by means of hub 62 and solid circular disc 63 to which the blades of the blower wheel are attached. The circular disc 63 acts as a partition within the blower wheel to divide in substantially equal portions the volume of inlet air taken into double inlet openings 64 at each side of blower housing 7-A. Thus circular disc 63 is located substantially midway between the two blower air inlet openings 64. A shutter assembly 21 is assembled to the right hand side of blower 7 covering the right hand side blower air inlet opening 64. Blower motor 8 drives blower 7 by means of pulleys and a V-belt in the conventional manner.

Upon blower housing 7-A is mounted a damper motor 20 connected with operating linkage 20-A to shutter assembly 21 shown in a closed position. Additional linkage 22-A extends from shutter 21 to lever 22, which is operably connected with gate 23 in cool air duct 10. A link 24-A from lever 22 to lever 24 controls the opening and closing of gate 25 in conjunction with the opening and closing of gate 23 in response to the operation of damper motor 20 through linkages 20-A, 22-A and 24-A. A spring 26 connected to lever 22 counteracts the pull of damper motor 20 through said linkages to return the damper motor arm to its at rest position.

Figure 10:
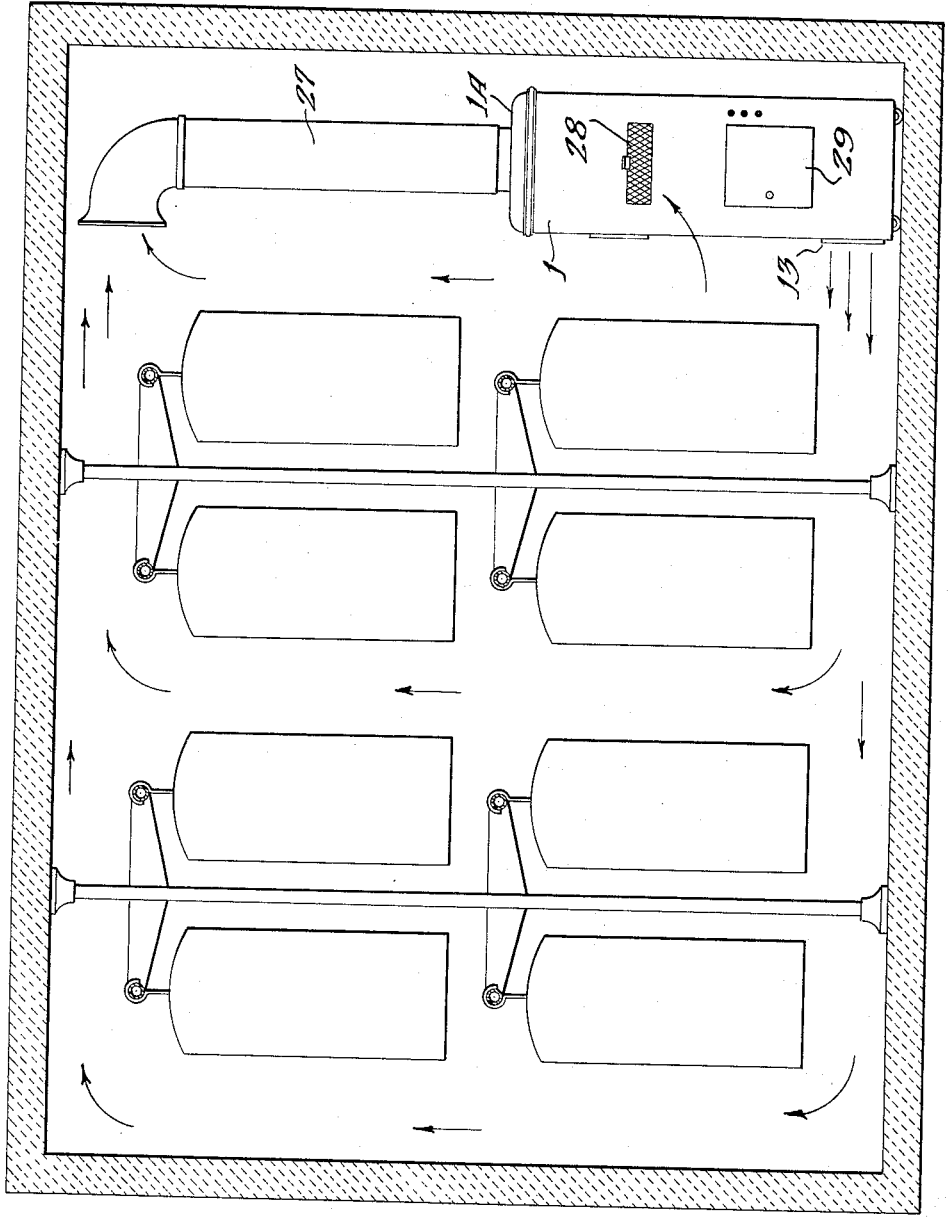
Fig. 10 shows a vertical sectional view through a garment storage vault in which a storage conditioning machine embodying this invention is installed, the direction and method of air circulation within the vault being shown with arrows.

In Figs. 1, 3 and 4 are shown air inlet ducts 27 attached to openings 19 in cabinet 1. These ducts extend to the ceiling level of the room in which the machine operates, as shown in Fig. 10. Grille 28, provides an auxiliary air inlet opening from the storage room to the space in front of the evaporator coils 5 and provides an inspection opening for viewing the fin surface of the coils during operation of the machine. Grille 28 is provided with a manually operable shutter 28-A for closing the opening of grille 28 or controlling the amount of auxiliary recirculated air admitted to the evaportors. An inspection door 29 is provided on both sides of the cabinet 1 to facilitate installation, inspection, adjustment, replacement and repair.

Figure 5:
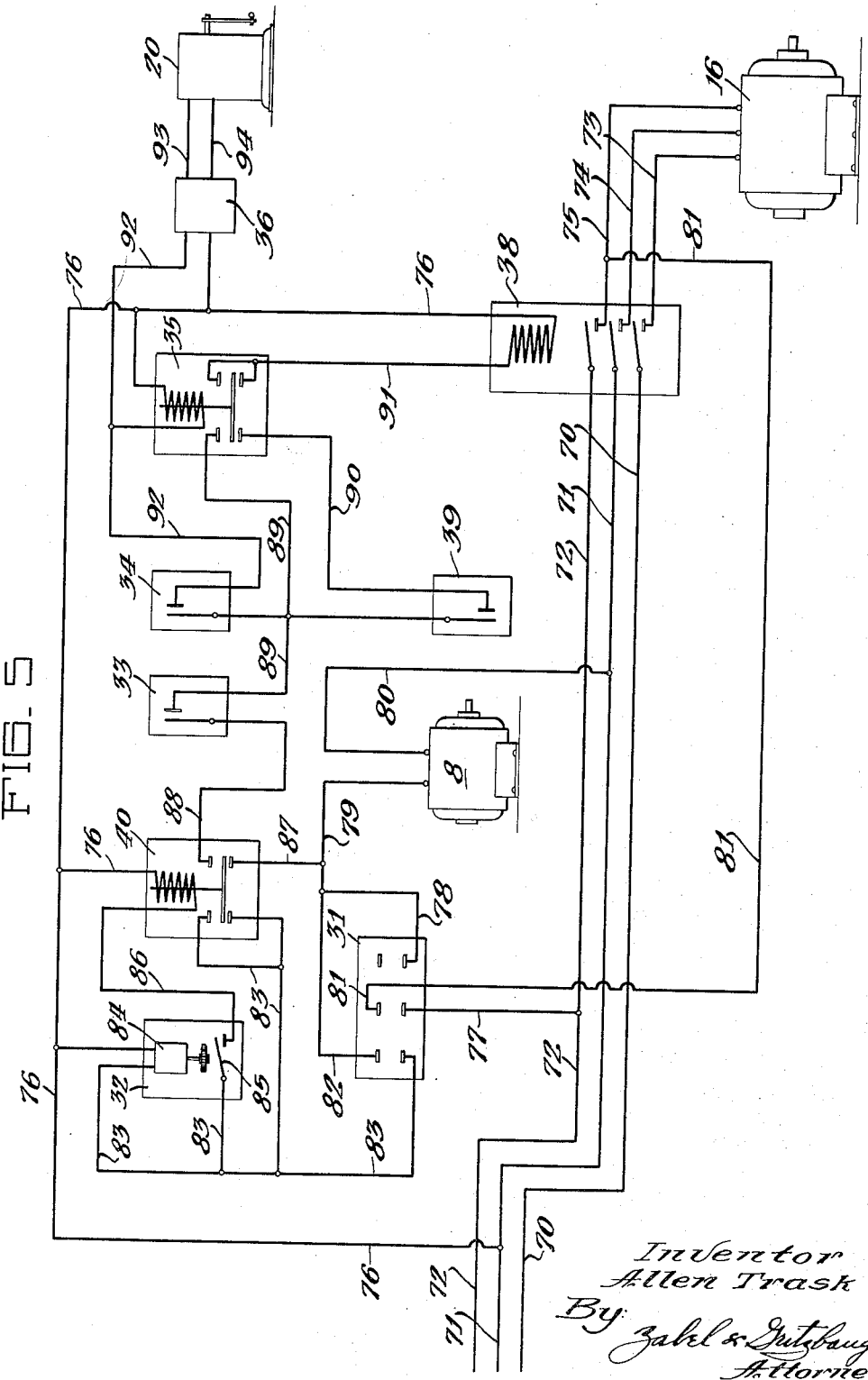
Fig. 5 is a wiring diagram showing the electrical components of the machine and the circuits of the automatic control system of this invention for controlling both the relative humidity and the temperature of the air in a storage room.

In Fig. 3, there is shown a panel 30 to which may be assembled the electrical control instruments for the machine shown diagrammatically in Fig. 5.

In Fig. 5, the wiring diagram of the machine, a 230 volt, 60 cycle, 3 phase line is connected to conductors 70, 71 and 72 of the machine, which connect with a three pole magnetic motor starting switch 38 which starts and runs compressor motor 16 through conductors 73, 74 and 75.

One phase of the line circuit is used to actuate the electrical control instruments. Conductor 76 used as a neutral wire of the single phase control circuit connects with clock motor 32, relay 40, relay 35, the actuating magnet of motor starter 38 and also transformer 36.

A manual double pole, double throw switch 31 is connected to energize selectively either one of two circuits. In its right hand position of switch 31 contact is made between conductors 77 and 78 to establish a circuit from line conductor 72 to conductor 79, energizing blower motor 8. The second pole of blower motor 8 is connected to line conductor 71 by conductor 80 to operate the blower motor only.

When manual switch 31 is set in its left hand position, a contact is made between conductors 81 and 82 to establish a circuit from motor starting switch 38, through conductors 75, 81, 82 and 79, to operate blower motor 8 during the time that motor starting switch 38 is closed to operate compressor motor 16.

When manual switch 31 is set in its left hand position, a second contact is established to connect conductor 77 with conductor 83 to establish a circuit from line conductor 72 to a pair of contacts on relay 40, to switch 85 and clock motor 84 of defrosting timer 32, which actuates its switch 85. Clock motor 84 is arranged to open switch 85 for a few minutes out of each three hours that clock motor 24 is energized and operating. When switch 85 is open, a circuit is established by the normally closed position of relay 40 from conductor 83 through conductors 87 and 79 to energize and operate blower motor 8. At such time only blower motor 8 in the machine will be operating, and this operation is for the purpose of defrosting coils 5.

When manual switch 31 remains in its left hand position and switch 85 of the defrosting timer is closed, then relay 40 is energized and contact is made between conductor 83 and conductor 88 to energize conductor 86 to pressure switch 33. The pressure switch 33 is normally closed. It is arranged to be opened only when the refrigerant pressures in the refrigeration system of the machine exceed or become depressed below the normal operating pressures of the system.

While pressure switch 33 is normally closed, contact is made between conductor 88 and conductor 89 to energize conductor 89, which in turn energizes humidistat 34, thermostat 39 and one normally open contact of relay 35. When humidistat 34 is satisfied it is open, and when thermostat 39 is satisfied it is open. When both the humidistat 34 and the thermostat 39 are satisfied the compressor motor will not operate because the starting switch 38 will not be energized or closed.

When the humidistat 34 is satisfied and open, and the thermostat 39 is not satisfied and therefore closed, relay 35 will be in its normally open position making contact between conductors 90 and 91. Thus a circuit will be established to energize compressor motor starting switch 38 from conductor 89, through conductors 90 and 91 and the motor and compressor will be put into operation to run until thermostat 39 is satisfied.

When humidistat 34 calls for a reduction in humidity in the storage room it will become closed, and when closed it will make contact between conductors 89 and 92 to energize relay 35 and transformer 36. The energizing of relay 35 makes a contact between conductors 89 and 91 to energize motor starter 38, causing the compressor motor and refrigeration system to operate until humidistat 34 becomes satisfied and opened. The energizing of transformer 36 in turn, energizes damper motor 20 through conductors 93 and 94. When thus energized damper motor 20 operates to pull on its linkage 20-A to accomplish functions hereinafter described.

When a storage machine embodying this invention is put to use for controlling the relative humidity and temperature within a closed room, vault or storage space, it is usually installed against one wall as shown in Fig. 10. The three conductors of a three phase electrical power line are connected to the machine conductors 70, 71 and 72 and pipe 50 is connected to a source of cooling water for the refrigeration condensing unit in the machine, pipe 53 is connected to a drain to dispose of cooling water warmed by the machine and pipe 56 is connected to a drain to dispose of condensed water vapor. Two air ducts 27 are assembled to the top of the machine at openings 19 to extend to the ceiling level of the room in which the machine is installed.

When the above listed connections are made, the following adjustments of the control instruments may be made for a fur storage vault, for example. The humidistat 34 is set for 55% relative humidity, the thermostat 39 is set for 60 degrees, the pressure switch 33 is set for an emergency high pressure cut-out at 175 pounds and a low pressure cut-out at 15 pounds; the defrosting timer 32 is set for stopping the condensing unit for 15 minutes out of each three hours of its running time. After the adjustments have been made the storage machine is put into operation by closing the manual switch 31 to its left hand position.

If the relative humidity in the storage room is less than 55% and the temperature less than 60 degrees, the switch contacts in both humidistat 34 and the thermostat 39 will remain open and the machine will not be called on to function. If the temperature in the room rises to 61 degrees, the thermostat 39 will close its contact to energize magnetic starter 38 which will cause the blower motor 8 and the compressor motor 16 to operate the refrigeration of the machine. Operation will then continue until the thermostat is satisfied by a temperature reduction to 60 degrees or less for which the thermostat is set. After each three hours of integrated compressor running time the defrosting timer stops the compressor while air circulation is maintained through the cooling coils to melt off any frost that may have accumulated thereon.

The blower 7 draws air from the ceiling level of the room through duct 27, down into cabinet 1, through evaporators 5 where it is cooled; and discharges the cooled air through cool air duct 10 into plenum chamber 11 from whence it is discharged horizontally parallel to the floor at the floor level. When the room is cooled to less than 60 degrees for which the thermostat 39 has been set, then the thermostat contact opens and both the cool air blower 7 and the condensing unit is caused to stop.

If the relative humidity in the room rises above 55%, regardless of the temperature or the position of the thermostat, then the humidistat contact will close to energize relay 35 which in turn will cause the damper motor 20, the blower 7 and the condensing unit to operate. This condition of machine operation wil cause maximum reduction of relative humidity of air passing through the machine.

When damper motor 20 is caused to operate by the humidistat calling for a reduction in humidity, it pulls upward against spring 26 to close shutter 21 and open gates 23 and 25 in cool air duct 10. When shutter 21 is closed the right hand air inlet to blower 7 is closed. This reduces the C. F. M. capacity of blower 7 to approximately one-half by admitting air only to one-half of the blower wheel through the left side opening in the blower housing. The reduced volume and velocity of air through evaporators 5 causes the evaporators to drop to a lower temperature which will cause increased condensation of water vapor from the air. The slower velocity of the air through the evaporators 5 will give added time for the air to give up its water vapor to the coil surfaces.

In the event the evaporator surfaces drop in temperature below the freezing point during a dehumidifying phase of operation, then the water vapor in the air will be collected on the evaporator surfaces in the form of frost or ice and the defrosting timer 32 will cause the frozen moisture to melt off in the fifteen minutes the condensing unit shuts off in each three hour period of operation by drawing air that is warmer than freezing through the coils 5.

When the cooled and dehumidified air is discharged by the blower 7 down the cool air duct 10, it is substantially in a saturated condition. Since gates 23 and 25 have been opened by the damper motor 20 during the dehumidifying phase of operation, part of the cooled air leaves cool air duct 10 through gate 23 and flows into the lower chamber 4, which encloses the condensing unit. Here this air becomes heated by the heat of operation of the compressor motor 16 and the compressor 15 and then it flows back into cool air duct 10 through open gate 25. The heating of this air reduces its relative humidity. This is a very important and useful result of this invention. Without the application of reheat to the cooled air flowing through a humidity controlling machine, the air discharged from the machine must be in substantially a saturated condition since moisture would not be rejected from the air at the cooling coils unless the air was cooled below its dew-point where it of necessity becomes saturated.

The storage of furs and all other dry merchandise that is adversely affected by excess relative humidity, requires that its ambient air be of a relative humidity much less than saturation. When a refrigeration machine is used for extracting moisture from the air a means of reheating the air is necessary for the accomplishment of efficient humidity control.

A machine embodying this invention is constructed to withdraw air from the ceiling level, to cool it, and then to discharge the cooled air horizontally at the floor level (see Fig. 10). The recirculation and cooling of air in an enclosed room in this way causes the air to move in the direction of naturally induced thermosyphonic connection. When the air in a room is cooled below outside temperature, then there is heat leakage into the room through the walls. The room air in contact with the walls becomes warmed. The warmed air rises to the ceiling level of the room because it is lighter in weight than the cooler air in the room. This natural thermosyphonic circulation of air in a room is encouraged and assisted by the use of machine constructed in accordance with this invention which specifies that the warmed air which collects naturally at the ceiling level shall be withdrawn from the ceiling level by a duct 27 of the machine, cooled and dehumidified within the machine and then discharged horizontally at the floor level.

In a test machine constructed in accordance with the specifications of this invention, a 5 H. P. condensing unit was used and a cool air blower having approximately 2,000 C. F. M. capacity discharged the cooled and dehumidified air at the floor level of a garment storage vault approximately 50 feet long by 25 feet wide and 12 feet high, having 15,000 cubic feet volume. The machine was placed at one end of the vault with the cool air discharge directed toward the opposite end wall, 50 feet distant. Fur and cloth garments were hanging in the vault suspended from racks that supported the garments to clear the floor by 14 inches to 18 inches, substantially as shown in Fig. 10 herein. In the open space under the garments the cooled air flowed along the floor of the vault and spreading out to cover substantially the whole floor area with a flow of cooled air, a distinct air flow could be felt at the opposite end of the vault from the machine, almost 50 feet distant. Identification tags tied to the garments with strings in the usual way were seen to move in the air flow at this distance from the machine.

In this installation set up for testing, the total volume of air in the vault was recirculated through the machine, cooled, and recirculated through the vault approximately every eight minutes of machine operation. Throughout the vault uniform air temperatures were maintained consistently with an average floor to ceiling temperature difference averaging approximately three degrees. The relative humidity in the vault was maintained between 50% and 55% and the temperature in the vault was maintained between 58 degrees and 62 degrees during summer weather between 80 degrees and 90 degrees.

It is desirable to fumigate storage vaults in which garments, seeds and other products subject to insect infestation are stored. When a vault equipped with a machine embodying this invention is in need of fumigation, it may be readily accomplished by the use of a commercial liquid fumigant such as a 50–50 combination of carbon tetrachloride and ethylene dichloride, used in the following manner:

Manual switch 31 on the control panel of the machine is set in its central or off position to stop the functioning of the machine for a period of approximately twenty-four hours to permit the warm-up to approximately the outdoors temperature. Warming the vault is for the purpose of rendering more active the insects in the vault. Active insects breathe more rapidly and are, therefore, more readily subject to the toxic effects of fumigant fumes.

When it is desired to start the fumigation process, a quantity of liquid fumigant equal to one and one-half gallons for each 1,000 cubic feet of vault volume is put into the fumigant pan 57 at the base of the machine through the conduit 58 which opens to the outside of the machine. A funnel may be used to assist in pouring the fumigant into this conduit. In some installations a conduit is connected to conduit 58 and extended outside the vault to a pump which is arranged to pump the correct amount of fumigant into pan 57. When the correct amount of liquid fumigant has been deposited in pan 57, then the manual switch on the control panel of the machine is set in its right hand position to cause the blower only of the machine to operate. The blower 7 causes air taken from the ceiling level of the vault to be discharged downward through duct 10, directly upon the surface of the fumigant liquid in pan 57. The agitating action and spread of this air flow rapidly evaporates the liquid fumigant into the turbulent air stream which then flows through louvers 14 in grille 13 out of the machine over the floor area of the vault. The fumigant fumes mixed with air are recirculated throughout the vault from floor to ceiling induced by the suction of the air intake into ducts 27 and the forcible discharge through grille 13 at the floor level. This fumigation process is usually continued for forty-eight hours and then stopped by the expelling of the fumigant fumes by a separate ventilating system.

It is to be understood that this invention is not to be restricted to the exact types of parts and the particular arrangement shown in the drawings since these may be modified under the teachings of this specification and will then come within the scope of the appended claims without departing from the spirit and scope of this invention.

Having thus described and explained my invention, I claim:

1. In a unitary machine for circulating air and controlling humidity within an enclosure, a housing for said machine, a condensing unit and an evaporator in said housing, an air inlet and an air outlet for said housing, a humidistat external of said housing, a double inlet blower in said housing a double inlet partitioned blower wheel in said blower arranged to draw air through said air inlet opening and to move it through one side of said double inlet blower and said air outlet opening, and means responsive to said humidistat for reducing the volume of air moved through said evaporator.

2. In a unitary machine for circulating air and controlling its humidity within an enclosure, a housing for said machine, a horizontal partition dividing said housing into an upper chamber and a lower chamber, an evaporator and an air inlet opening in said upper chamber, a condensing unit and an air outlet opening in said lower chamber, a double inlet blower arranged to move air from said upper chamber to said lower chamber, a humidistat external of said housing, and means responsive to said humidistat for closing one air inlet opening in said double inlet blower.

3. In a unitary machine for circulating air and controlling its humidity within an enclosure, a housing for said machine, a horizontal partition dividing said housing into an upper chamber and a lower chamber, an evaporator, an air inlet opening and a blower in said upper chamber said air inlet opening being in the top portion of said upper chamber, a condensing unit and a duct in said lower chamber, a plenum chamber in the bottom portion of said housing under said lower chamber, an air outlet opening in said plenum chamber, said duct providing communication between said blower and said plenum chamber, a humidistat external of said housing, and means responsive to said humidistat for establishing an air circuit between said duct and said lower chamber.

4. In a unitary machine for circulating air and controlling its humidity and temperature within an enclosure, a housing enclosing said machine, a refrigeration condensing unit in said housing, a refrigerant evaporator in said housing, a humidistat and a thermostat mounted external of said housing, an air inlet opening and an air outlet opening in said housing, a double inlet blower within said housing arranged to draw air through said air inlet opening and to move it through said evaporator and said air outlet opening, means responsive to said thermostat for operating said condensing unit, and means responsive to said humidistat, superseding said thermostat for operating said condensing unit and coincidentally closing one inlet of said blower.

5. In a unitary machine for circulating air and controlling its humidity within an enclosure, a housing for said machine, a condensing unit and an evaporator in said housing, an air inlet and air outlet for said housing, a humidistat external of said housing, a double inlet blower in said housing arranged to draw air through said air inlet opening and to move it through said evaporator and said air outlet opening, a double inlet centrally partitioned blower wheel in said blower, and means responsive to said humidistat for closing one air inlet of said double inlet blower.

6. In a unitary machine for circulating air and controlling its humidity within an enclosure, a housing for said machine, a humidistat external of said housing, a condensing unit and an evaporator in said housing, an air inlet opening in the upper portion of said housing, a duct communicating with said air inlet opening and the upper portion of an enclosure in which said machine is installed, an air outlet opening in the bottom portion of said housing positioned adjacent to the floor of said enclosure, a blower in said housing arranged to draw air through said air inlet opening and duct and to discharge it from said outlet opening, and means responsive to said humidistat for reducing the volume of air moved through said evaporator.

7. In a unitary machine for circulating air and controlling its humidity within an enclosure and for periodically fumigating the enclosure, a housing for said machine, a humidistat external of said housing, a condensing unit and an evaporator in said housing, an air inlet opening in the upper part of said housing, a horizontal shallow pan for fumigant at the bottom portion of said housing, means for introducing fumigant into said pan, an air outlet opening in said housing adjacent to the top of said fumigant pan, a blower in said housing arranged to draw air through said air inlet opening and discharge it downward toward said fumigant pan, and means responsive to said humidistat for reducing the volume of air moved by said blower.

ALLEN TRASK.

References Cited in the file of this patent

UNITED STATES PATENTS

| Number | Name | Date |
|---|---|---|
| 1,837,798 | Shipley | Dec. 22, 1931 |
| 1,945,379 | Roesch | Jan. 30, 1934 |
| 2,236,058 | Henney | Mar. 25, 1941 |
| 2,286,491 | Kucher | June 16, 1942 |
| 2,369,511 | Winkler | Feb. 13, 1945 |
| 2,438,120 | Freygang | Mar. 23, 1945 |
| 2,497,068 | Canney | Feb. 14, 1950 |
| 2,528,720 | Binder | Nov. 7, 1950 |